(12) United States Patent
Narayan et al.

(10) Patent No.: US 8,889,770 B2
(45) Date of Patent: *Nov. 18, 2014

(54) BROMINATED FLAME RETARDANT, ANTIMONY OXIDE FREE POLYMER FORMULATIONS

(75) Inventors: Subramaniam Narayan, West Lafayette, IN (US); Harry A. Hodgen, Battle Ground, IN (US)

(73) Assignee: Chemtura Corporation, Middlebury, CT (US)

( * ) Notice: Subject to any disclaimer, the term of this patent is extended or adjusted under 35 U.S.C. 154(b) by 87 days.

This patent is subject to a terminal disclaimer.

(21) Appl. No.: 13/567,420

(22) Filed: Aug. 6, 2012

(65) Prior Publication Data

US 2013/0053482 A1 Feb. 28, 2013

Related U.S. Application Data

(60) Provisional application No. 61/527,262, filed on Aug. 25, 2011.

(51) Int. Cl.
| | | |
|---|---|---|
| *C08K 5/04* | (2006.01) | |
| *C08K 5/06* | (2006.01) | |
| *C08K 5/3492* | (2006.01) | |
| *C08L 25/06* | (2006.01) | |
| *C08L 55/02* | (2006.01) | |
| *C08K 5/00* | (2006.01) | |
| *C09K 21/08* | (2006.01) | |
| *C08L 71/12* | (2006.01) | |

(52) U.S. Cl.
CPC ............... *C08K 5/06* (2013.01); *C08K 5/0066* (2013.01); *C09K 21/08* (2013.01); *C08L 71/12* (2013.01)
USPC ........... 524/100; 524/281; 524/299; 524/371; 524/405; 524/417; 524/423; 524/424; 524/429; 524/430; 524/432; 524/433; 524/442

(58) Field of Classification Search
USPC ......... 524/100, 281, 299, 371, 405, 417, 423, 524/424, 429, 430, 432, 433, 442
See application file for complete search history.

(56) References Cited

U.S. PATENT DOCUMENTS

| | | |
|---|---|---|
| 3,760,003 A | 9/1973 | Asadorian et al. |
| 3,883,613 A | 5/1975 | Cooper |
| 4,024,093 A | 5/1977 | Abolins et al. |
| 4,888,370 A | 12/1989 | Freitag et al. |
| 5,143,955 A | 9/1992 | Kendall et al. |
| 2006/0167143 A1 | 7/2006 | Borade et al. |
| 2007/0040154 A1 | 2/2007 | Murakami |
| 2010/0160516 A1 | 6/2010 | Timberlake et al. |
| 2010/0292376 A1 | 11/2010 | Timberlake et al. |
| 2011/0004003 A1 | 1/2011 | Nishihara et al. |
| 2011/0184107 A1* | 7/2011 | Timberlake .................. 524/371 |

FOREIGN PATENT DOCUMENTS

WO   WO 2009/084800 A1   7/2009

* cited by examiner

*Primary Examiner* — Kriellion Sanders
(74) *Attorney, Agent, or Firm* — Joseph Suhadolnik; Chemtura Corporation; George Romanik

(57) ABSTRACT

Antimony free flame retardant compositions are prepared by combining a polymer resin, certain halogenated polyphenylene ether flame retardants and a non-brominated phenoxy oligomer or polymer such as a poly-phenylene ether, aryloxyester, or aryloxycarbonate. The present antimony free flame retardant compositions also typically have more desirable physical properties than similar compositions comprising antimony trioxide and other flame retardant. In particular embodiments, ATO free flame retardant HIPS and PC/ABS compositions are provided.

8 Claims, No Drawings

BROMINATED FLAME RETARDANT, ANTIMONY OXIDE FREE POLYMER FORMULATIONS

This application claims benefit under 35 USC 119(e) of U.S. Provisional Application No. 61/527,262 filed Aug. 25, 2011, the disclosure of which is incorporated herein by reference.

Excellent flame retardant activity is obtained without the use of antimony synergists or similar metal based synergists in compositions comprising select a halogenated polyphenylene ether flame retardant and a non-brominated phenoxy oligomer or polymer such as a poly-phenylene ether, aryloxyester, or aryloxycarbonate.

BACKGROUND

The addition of flame retardants to polymer resins during processing is well known. Flame-retardant additives can be categorized in general by three basic mechanisms. Vapor phase flame-retardants work in the vapor phase by free radical flame poisoning, which removes active free radicals that promote further exothermic reactions. The ubiquitous halogenated flame-retardants are believed to function as vapor phase flame-retardants. Often, these compounds are used along with synergists, e.g., antimony synergists. Condensed-phase flame-retardants promote the formation of char in the solid phase to form an insulating layer which protects the flammable substrate from the fire and reduces the emission of volatile flammable gases into the fire. Many phosphorus and silicone-based flame retardants are believed to function as condensed-phase flame-retardants. Heat sink flame-retardants work via endothermic reactions by releasing water and/or carbon dioxide, which quench the fire.

Halogenated organic compounds, including oligomeric and polymeric materials are widely used and are highly effective flame retardant additives for polymer resins. Examples of commercially available brominated flame retardants include tetrabromobisphenol A, bis(2,3-dibromopropyl ether), hexabromocyclododecane, tris(tribromoneopenyl)phosphate, poly(pentabromobenzyl acrylate), decabromodiphenyl oxide, tris(tribromophenyl)cyanurate, tris-dibromopropyl isocyanurate, brominated polystyrenes and poly(bromostyrenes).

In order to meet high flame retardance standards in thermoplastics, for example, the UL-94 V-0 standard, halogenated flame retardants are generally blended with a synergist, most commonly antimony trioxide (ATO). However, for compliance with voluntary environmental standards, the use of antimony trioxide has been restricted due to its chemical hazard classification. Also, the use of synergists can lead to challenges in coloring, increased cost, and can in some cases negatively impact polymer properties. It would therefore be highly desirable to limit or eliminate antimony compounds and similar synergists from polymer compositions.

Thermoplastic polyphenylene oxide resins, such as polymers of 2,6-dimethylphenol, are commercially available and are most often encountered as polymer additives or as part of a polymer blend, e.g., polyamide blends and high impact polystyrene, i.e., HIPS.

Polyphenylene ethers (PPE), also called polyphenylene oxides (PPO), are inherently flame resistant. U.S. Pat. No. 4,888,370 discloses the use of PPO as a flame retardant additive in polyamide. U.S. Published Patent Application No. 2010/0292376 discloses the use of polyphenylene ethers as a flame retardant adjuvant in polymer resins comprising benzylic phosphine oxide flame retardants.

PPOs are often not very effective as flame retardants on their own and are more often added to polymer resins to improve physical properties such as dimensional stability, mechanical and dielectric strength etc. In many such applications where PPO is used, other flame retardant additives or packages, such as phosphinates, halogenated flame retardants metal synergists etc, are incorporated when flame retardance is required.

U.S. Published Patent Application No. 2006/0167143 discloses a composition which comprises a compatibilized poly (arylene ether)/polyamide blend, a phosphinate flame retardant and a flame retardant augment selected from the group consisting of melamine polyphosphate, zinc borate, low melting glass and talc.

U.S. Pat. No. 420,393, discloses a self-extinguishing thermoplastic molding composition, such as rubber-modified high-impact polystyrene, with improved mechanical properties and good flame resistance comprising styrene resin, polyphenylene ether resin, a halogenated aromatic frame retardant compound, an antimony containing compound and an additive selected from the group consisting of polyesters and, polyethylene.

U.S. Pat. No. 4,024,093 discloses a flame retardant thermoplastic molding composition comprising polyphenylene ether resin, a vinyl aromatic resin, an aromatic halogenated flame retardant; and a flame retardant amount of an organic iron. U.S. Pat. No. 5,143,955 discloses a composition comprising a polyphenylene ether resin, e.g., poly(2,6-dimethyl-1,4-phenylene)ether, a high impact polystyrene resin, a brominated aromatic flame retardant and a high molecular weight polystyrene resin.

U.S. Pat. No. 7,816,430 discloses a curable composition for a printed wiring board comprising a cyanate ester compound and/or a prepolymer thereof, a specific epoxy resin, a monovalent phenol and a polyphenylene ether resin. The composition can further comprise a brominated flame retardant. Among the list of possible flame retardants is brominated polyphenylene ether.

Aryloxy carbonates, such as the widely used bis-phenol A polycarbonate (BPA-PC) and similar materials, are commercially available thermoplastic polymers. PCs may be used as the sole or predominate polymer in a plastic article, and also find use in various blends, for example, PC-ABS blends. Polycarbonates are not typically associated with flame retardant activity.

Halogenated polyphenyl ethers are known flame retardants. U.S. Pat. No. 3,760,003 discloses compounds of the formula

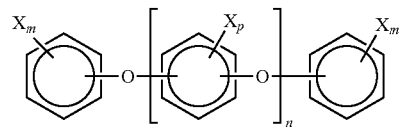

wherein each X is independently Cl or Br, each m is independently a number from 0 to 5, p is a number from 0 to 4, and n is a number from 1 to 5, which are useful as flame retardants in polymer resins such as polyester, polystyrene and ABS. Published US Pat. Appl. 2011/0040003 and 20110184107, and copending U.S. application Ser. No. 13/248,387, published as US 20120065297, the disclosures of which are incorporated herein by reference, disclose mixtures of brominated aryl ether oligomers as flame retardants.

It has been found that certain of these halogenated poly ether flame retardants can interact with synergists, adjuvants and other materials differently than many similar halogenated aromatic flame retardants. Very surprising is the discovery that the halogenated polyethers having at least three halogenated aromatic rings are more effective than decabromodiphenyl ether when used in combination with phenoxy containing materials such as polyphenylene ethers, aryl carbonates and the like, e.g., non-halogenated PPOs such as polymers of 2,6-dimethylphenol and aromatic polycarbonates.

As a result, it has now been found that compositions comprising a mixture of halogenated polyethers, wherein the majority of the ethers comprise at least three halogenated aromatic rings, and non-brominated polypheneylene oxide ethers or aryl carbonates can be prepared that meet the UL-94 V-0 standard for flame retardancy without the addition of metal based synergists. Other brominated aromatic flame retardants tested do not achieve the V-O standard unless a metal based synergist like antimony trioxide is added. The present invention allows for increased flexibility in formulating polymer compositions containing no ATO, or reduced levels of ATO, with excellent flame retardancy and excellent physical characteristics.

SUMMARY OF THE INVENTION

The invention provides an antimony free, flame retardant polymer composition, e.g., a thermoplastic polymer composition, comprising one or more, typically more than one, oligomeric halogenated polyphenyl ether flame retardant of formula I

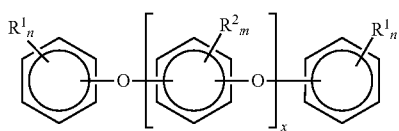

wherein each $R^1$ is independently selected from halogen and alkyl, each $R^2$ is independently selected from halogen and alkyl, provided at least one $R^2$ is halogen, n is from 0 to 5, e.g., 1, 2, 3, 4 or 5; m is from 1 to 4, and x is from 1 to 10, and an oligomeric or polymeric phenoxy material capable of acting as a synergist with the flame retardant of formula I, i.e., an oligomer or polymer comprising monomer units of formula II

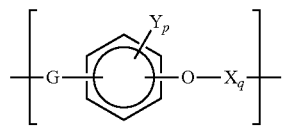

wherein
Y is an alkyl group of from 1 to 12 carbon atoms, for example 1 to 4 carbon atoms;
X is a carbonyl or carbonyloxy group:
G is a direct bond, phenylene, or an aralkylene group of 7 to 9 carbon atoms;
q is 0 or 1; and
p is from 0 to 4, for example, p is 0, 1 or 2.

Generally the halogen content of the halogenated aryl ether oligomers of formula I is at least 50 wt %, for example, when $R^1$ and $R^2$ as halogen are bromine, the halogen content of the halogenated aryl ether oligomer(s) is from 50 to about 83 wt %, e.g., a halogen content of from about 65 to about 83 wt %, In some particular embodiments the oligomeric or polymeric phenoxy material is a polyphenylene ether. In other particular embodiments the oligomeric or polymeric phenoxy material is an aryl carbonate comprising phenoxy moieties, e.g., bis-phenol-A-polycarbonate. The phenoxy material of the invention may be compounded into a polymer resin along with the flame retardant of formula I, or it may be already part of a polymer blend, e.g., in PC-ABS, into which the flame retardant of formula I is added. In some embodiments of the invention the oligomeric or polymeric phenoxy material acting as synergist for the flame retardant may be the majority component of the flame retardant polymer composition, in other embodiments, the compounds of formula I and formula II together may represent less than 50% of the overall composition.

The composition of the invention is free of antimony compounds and in many embodiments, is also free of other metal based flame retardant synergists, such as iron oxide, organo iron compounds etc. In certain embodiments there are no metal based synergists present. In other embodiments flame retardant synergists which do not contain antimony or iron are present, especially as many flame retardant synergists are also used for other purposes, for example, silica, titanium oxide and the like. Organic synergists such as melamine derivatives may also be present in the composition.

DESCRIPTION OF THE INVENTION

Provided is an antimony free flame retardant polymer composition comprising
a) a polymer resin, e.g., a thermoplastic polymer resin,
b) one or more oligomeric halogenated polyphenyl ethers of formula I

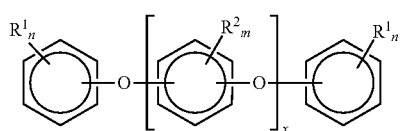

wherein each $R^1$ is independently selected from halogen and alkyl,
each $R^2$ is independently selected from halogen and alkyl, provided at least one $R^2$ is halogen, n is from 0 to 5, e.g., 1, 2, 3, 4 or 5; m is from 1 to 4, e.g., 1, 2, 3 or 4; and x is from 1 to 10, and
c) an oligomeric or polymeric phenoxy material comprising monomer units of formula II

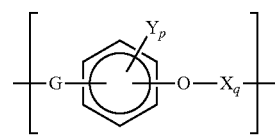

wherein
q is 0 or 1; p is from 0 to 4, for example, p is 0, 1 or 2;
Y is an alkyl group of from 1 to 12 carbon atoms, for example 1 to 4 carbon atoms;
X is a carbonyl or carbonyloxy group:

G is a direct bond, phenylene, or an aralkylene group of 7 to 9 carbon atoms;
which flame retardant polymer composition is free of antimony compounds.

The polymer resin a) is not the same as the oligomer or polymer of c). In certain embodiments, the polymer resin a) is present in an amount that is greater by weight than component c), in other embodiments component c) is present in the greater amount.

Also provided is a method for producing an antimony free flame retardant polymer resin composition comprising incorporating into a polymer resin, e.g., a thermoplastic polymer resin, during melt processing, oligomeric halogenated polyphenyl ethers of formula I

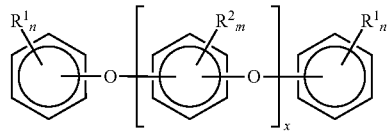

I wherein each $R^1$ is independently selected from halogen and alkyl, each $R^2$ is independently selected from halogen and alkyl, provided at least one $R^2$ is halogen, n is from 0 to 5, e.g., 1, 2, 3, 4 or 5; m is from 1 to 4, e.g., 1, 2, 3 or 4; and x is from 1 to 10,
wherein an oligomeric or polymeric phenoxy material comprising monomer units of formula II is either present in the polymer resin or is added thereto,

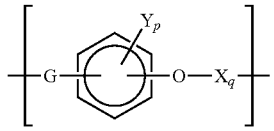

II wherein
Y is an alkyl group of from 1 to 12 carbon atoms, for example 1 to 4 carbon atoms;
X is a carbonyl or carbonyloxy group:
G is a direct bond, phenylene, or an aralkylene group of 7 to 9 carbon atoms;
q is 0 or 1; and
p is from 0 to 4, for example, p is 0, 1 or 2;
and wherein no antimony compounds are present in, or added to the polymer resin.

For example, when G is a direct bond and q is 0, the oligomeric or polymeric phenoxy material c) is an oligomer or polymer comprising monomer units of formula III

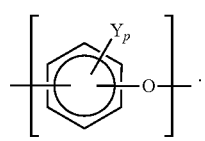

III

When q is 1 the oligomeric or polymeric phenoxy material c) is an oligomer or polymer comprising monomer units of formula IV or V

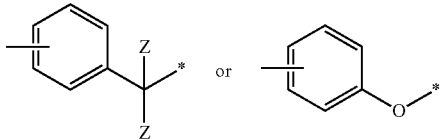

IV

V

In many embodiments when q is 1, G is for example a group

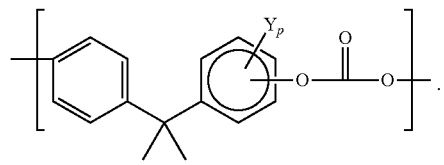

Wherein each Z is, e.g., independently H or methyl, and the asterisk designates the connection point to the phenyl ring pictured in formula II.

For example, in many embodiments where q is 1, the oligomer or polymer comprising monomer units of formula VI is a compound of formula VI,

VI

Typically in compounds of formula VI, p is 0.
Halogenated ether compounds of formula I are known and can be prepared by a number of known processes, for example, Published US Pat. Appl. 2011/0040003, 20110184107, and US 20120065297, already incorporated by reference. Typically, the halogenated aryl ether component of the invention comprises a mixture of halogenated aryl ether oligomers with a halogen content of the halogenated aryl ether oligomers is at least 50 wt %, based on the total weight of all halogenated aryl ether oligomers. For example, when $R^1$ and $R^2$ as halogen are bromine, the halogen content of the halogenated aryl ether oligomer(s) is from 50 to about 83 wt %.

Typically, $R^1$ and $R^2$ are halogen, such as chlorine or bromine, most often bromine and n and m are at least 1, often at least 2, for example n is 3, 4 or 5 and m is 2, 3 or 4. In many embodiments, the halogenated aryl ether comprises a mixture of oligomers of varying lengths wherein x is from 1 to 10, for example, 1 to 6 or 1 to 4. For example the halogenated aryl ether comprises a mixture of oligomers of varying lengths wherein x is 1, 2 and 3.

The ether linkages relative to each other on non-terminal aryl rings in formula I may be ortho, meta or para. In some embodiments, mixtures of ortho, meta and/or para linkages are present. In one embodiment, at least 50% of the ether linkages on non-terminal aryl rings of formula I are meta to each other; in anther embodiment at least 50% of the ether linkages on non-terminal aryl rings of formula I are para to each other.

The halogen content of the oligomeric halogenated polyphenyl ethers can vary. In some particular embodiments the halogen is bromine and the bromine content is from about 70 to about 82% or about 74 to about 80%. In one particular embodiment the bromine content is about 78 to about 79%.

For example, a mixture of brominated phenyl ether oligomers of formula I is prepared by adding a mixture of phenyl ether oligomers, e.g., a compound of formula I wherein R is hydrogen, to a mixture of bromine and bromination catalyst and the amount bromine content is controlled by a choosing the addition time, hold time, and reaction temperature.

For example, a mixture of phenolic ether oligomers comprising individual oligomers of 3, 4, 5, 6, 7 and 8 phenyl rings connected through the ether oxygen are brominated according to the above process. In one particular embodiment the phenolic ether oligomers comprise, as determined by gc analysis, about 30 to about 50% 3-ring oligomers, 30 to 60% 4-ring oligomers, 1 to 15% 5-ring oligomers and less than 15% total of oligomers containing 6 or more phenyl rings.

Given that the brominated oligomers of the invention are more effective when used according to the invention than brominated diphenyl ether, the amount of diphenyl ether materials are kept to a minimum, in many embodiments compositions of the invention contain from 0 to 2% and often from 0 to 1% or less by weight based on the overall composition of brominated diphenyl ether.

For example, the brominated phenolic ether oligomers comprise, as determined by gc analysis:
from about 30 to about 45%, e.g., about 35 to about 45% of 3-ring oligomers,
from about 35 to about 60%, e.g., about 35 to about 55% of 4-ring oligomers,
from about 1 to about 10%, e.g., about 3 to about 10% of 5-ring oligomers,
from about 1 to about 10%, e.g., about 3 to about 10% of 6-ring oligomers,
from about 0.1 to about 4%, e.g., about 0.1 to about 3% of 7-ring oligomers, and
from about 0 to about 2%, e.g., about 0 to about 2.5% of 8-ring oligomers.

In one embodiment, the brominated phenyl ether oligomer composition obtained according to the above process from the above described ethers has a bromine content of from about 77 to about 80%, in some cases from about 78 to about 79%, and a Tg of from about 145 to about 195° C., in some cases from about 150 to about 190° C.

The phenoxy materials of component c) are commercially available or can be prepared by a number of known processes. The phenoxy material may be an oligomer comprising from 3 to 9 monomer units of formula III or IV, many of which are well known materials. In many embodiments the phenoxy material comprises polymers comprising at least 10 monomer units of formula II, generally more than 10, often more than 100 monomer units. Such polymers are also well known, readily available, easily handled and are often more likely to impart appropriate physical properties to the polymer composition than the oligomers. In many embodiments the phenoxy material c) has a weight average molecular weight of from about 1,000 to about 100,000, for example, from about 1,500 to about 80,000, or about 1,500 to about 50,000.

More than one oligomer or polymer phenoxy material may be present as component c). The phenoxy materials that make up component c) need not be homopolymers and can comprise more than one monomer unit of formula II and/or other monomer units outside of formula II, however, the majority of monomer units are of formula II.

In many embodiments the phenoxy material c) is selected from polyphenylene ethers comprising monomers of formula III. For example, suitable polyphenylene ethers (PPE) may be prepared according to the disclosure of U.S. Pat. No. 4,659,763 and the references found therein, however, the PPEs of the invention are not limited by preferred embodiments of U.S. Pat. No. 4,659,763 and may, for example, have a higher or lower molecular weight than the PPEs specifically disclosed therein.

Examples of PPEs useful in the invention include poly(2,6-dilauryl-1,4-phenylene)ether; poly(2,6-diphenyl-1,4-phenylene)ether; poly(2-methyl-6-phenyl-1,4-phenylene)ether; poly(2,6-dibenzyl-1,4-phenylene)ether; poly(2,6-dimethyl-1,4-phenylene)ether; poly(2,6-diethyl-1,4-phenylene)ether; poly(2-methyl-6-ethyl-1,4-phenylene)ether; poly(2,6-dipropyl-1,4-phenylene)ether; poly(2-ethyl-6-propyl-1,4-phenylene)ether; poly(2-methyl-1,4-phenylene)ether, poly(3-methyl-1,4-phenylene)ether; poly(2-methyl-6-allyl-1,4-phenylene)ether; poly(2,3,6-trimethyl-1,4-phenylene)ether; poly(2,3,5,6-tetramethyl-1,4-phenylene)ether; poly(2,5-dimethyl-1,4-phenylene)ether and the like.

In many embodiments the phenoxy material c) is a polyphenylene ether of formula IIIa

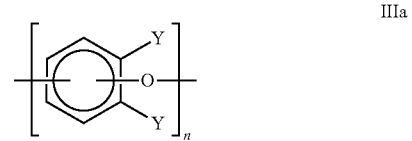

IIIa wherein Y is a $C_{1-4}$ alkyl group and n is from about 12 to about 500. For example, the synergist c) of the invention is selected from poly(2,6-dimethyl-1,4-phenylene)ether; poly(2,6-diethyl-1,4phenylene)ether; poly(2-methyl-6-ethyl-1,4-phenylene)ether; poly(2,6-dipropyl-1,4-phenylene)ether and poly(2-ethyl-6-propyl-1,4-phenylene)ether.

The polyphenylene ether may be added to the polymer resin during processing or may be part of a polymer blend to which the brominated ether flame retardants are added.

In certain embodiments the phenoxy material of component c) is an aryl carbonate oligomer comprising from 3 to 9 monomer units of formula IV, or polymer comprising 10 or more monomer units of formula IV. Such carbonates are commercially available or can be prepared by a number of known processes. Often, when the phenoxy material is an aryl carbonate, it is a polymer resin which is part of a polymer blend, e.g. a blend with the polymer resin a), and it may be the majority component of the blend.

The polymer resin a) may be selected from a wide variety of polymers or co-polymers. For example, the polymer resin a) is a polyolefin such as polyethylene, polypropylene or a TPO; a polycarbonate that is not the same as the material of component c), a polystyrene or a rubber modified styrene, a polyamide, a polyester such as poly(ethylene terephthalate), poly(butylene terephthalate) or poly(ethylene naphthalenedicarboxylate), a polyurethane, a polyacrylate, a polyacrylamide, polyacrylonitrile, poly(vinyl chloride), polyacetal (polyoxymethylene), polyvinyl alcohol, polyvinyl acetate, epoxy resin a natural or synthetic rubber, or blends or copolymers thereof, such as ABS, PETG etc. The polymers may also contain fillers and reinforcing agents such as glass fibers.

Obviously, excellent results would be expected when the flame retardant b) is blended into a composition wherein the only polymer resin is an aryl polycarbonate etc, with or without an additional synergist.

In many embodiments, the flame retardant polymer composition is a flame retardant thermoplastic composition, for example, comprising as the resin a polyolefin, a polystyrene, a rubber modified styrene, a polyamide, a polyester, polyurethane, a polyacrylate, polyacrylonitrile, poly(vinyl chloride), ABS, PETG and the like; for example, polyethylene, polypropylene, a polystyrene, a rubber modified styrene, a polyamide, a polyester or ABS.

In one embodiment the resin is a polystyrene, polyester or polyamide, for example the polymer may be polyamide-6,6, a glass filled polyamide, HIPS or PET. In a particular embodiment the polymer resin a) is a styrene, i.e., HIPS, which is blended with a polyphenylene ether according to c) forming a PPE/HIPS blend; or a) is ABS blended with a PC according to c) forming a PC-ABS blend.

The polymer compositions of the invention will often also comprise standard additives such as thermal and light stabilizers, processing aids, colorants, antistats, optical brighteners, fillers, plasticizers, molding agents, and other commonly encountered additives. For example, common stabilizers include phenolic antioxidants, hindered amine stabilizers, ultraviolet light absorbers, phosphites, phosphonites, alkaline metal salts of fatty acids, the hydrotalcites, epoxidized soybean oils, hydroxylamines, tertiary amine oxides, lactones, thermal reaction products of tertiary amine oxides, thiosynergists etc.

The halogenated aryl ether oligomers of the invention b) and the phenyl oxide material c), if not already present as a blend with the resin a), are incorporated into the polymers via standard melt blending methods including Brabender mixing, extrusion, blow molding, injection molding, etc.

Melt processing is a convenient method of making a wide variety of polymeric articles, wherein a polymer, e.g., a thermoplastic polymer, is raised close to or above its melting temperature and extruded, cast or molded into a desired shape and is an efficient method for incorporating the present flame retardants into the polymer resins. Melt processed articles include molded articles, such as electronic housings, automotive parts, electrical connectors, electrical insulation for such as wire, coils and bobbins, extruded, blown or cast films, spunbond or melt-blown fibers, monofilaments, tows, fabrics and the like.

The amount of oligomeric halogenated polyphenyl ethers b) and phenyoxy material c) blended into the flame retardant composition in order to achieve a UL-94 V-0 rating will vary according to the various polymer resins present. In some embodiments, such as flame retardant PC-ABS blends, one of the polymer resins of the blend is also the material acting as the synergist of component c). In some of these embodiments, the amount of the resin serving as the synergist is present in amounts greater than what might be required for flame retardancy alone because of other properties the resin adds to the blend. Thus, in one example, the invention pertains to a flame retardant PC-ABS blend composition wherein up to 85 wt % of the composition is a polycarbonate material as defined in component c) of the invention.

In general, the antimony free flame retardant polymer composition comprises the polymer resin a), from about 1 to about 35%, e.g. 1 to about 25% by weight of the polymer composition of the oligomeric halogenated polyphenyl ethers b), from 1 to about 85% by weight of the oligomeric or polymeric phenoxy material c), and from 0 to about 10 wt % of any optional non-antimony flame retardant synergist or adjuvant.

The amount of oligomeric halogenated polyphenyl ethers b) required for adequate flame retardancy will in many cases be determined by the amount of phenoxy material c) present. For example, in one series of tests it was found that a PC/ABS blend wherein 80% of the blend was PC needed 8% by weight loading of b) to achieve a UL-94 V-O rating, whereas a PC/ABS blend wherein 30% of the blend was PC needed 22% by weight loading of b) to achieve the same rating.

For example, in one embodiment, the flame retardant polymer composition comprises:

a) a polymer resin, for example, a polymer selected from a polyolefin; a polycarbonate that is not the material of component c), a polystyrene, a rubber modified styrene, a polyamide, a polyester, a polyurethane, a polyacrylate, a polyacrylamide, polyacrylonitrile, poly(vinyl chloride), polyacetal (polyoxymethylene), polyvinyl alcohol, polyvinyl acetate, epoxy resin, a natural rubber, a synthetic rubber and blends and copolymers thereof.

b) from about 1 to about 35% by weight of the flame retardant polymer composition of halogenated aryl ether oligomers of formula I as described above, for example, a mixture of brominated phenolic ether oligomers according to formula I comprising, as determined by gc analysis:

from about 30 to about 45%, e.g., about 35 to about 45% of 3-ring oligomers, from about 35 to about 60%, e.g., about 35 to about 55% of 4-ring oligomers, from about 1 to about 10%, e.g., about 3 to about 10% of 5-ring oligomers, from about 1 to about 10%, e.g., about 3 to about 10% of 6-ring oligomers, from about 0.1 to about 4%, e.g., about 0.1 to about 3% of 7-ring oligomers, and from about 0 to about 2%, e.g., about 0 to about 2.5% of 8-ring oligomers;

c) from about 1 to about 85% by weight of one or more oligomeric or polymeric phenyoxy material phenoxy material comprising monomers units of formula II as described above, for example, a polymer comprising monomers units of formula III and/or a polymer comprising monomers units of formula VI;

d) from 0 to about 10% by weight of a non-antimony flame retardant synergist or adjuvant.

Unless otherwise specified the article "a" or "an" can mean one or more than one.

For example, the flame retardant polymer composition of the preceding embodiment comprising a) the polymer resin, for example, a polymer selected from a polyolefin such as a polyethylene, polypropylene or TPO; a polystyrene such as a high impact polystyrene (HIPS), a polyamide, a polyester, polyacrylonitrile, epoxy resin, a natural rubber, a synthetic rubber and blends and copolymers thereof b) from 1 to about 35%, e.g., from 1 to about 30%, from 1 to 25%, 1 to 20%, 2 to 15% or 3 to 12% by weight of the halogenated aryl ether oligomers of formula I;

c) from about 5 to about 85%, e.g., from about 5 to about 30%, about 5 to about 25% or about 10 to about 25% by weight of the phenoxy material comprising monomers units of formula II, and d) from 0 to about 10% by weight of a non-antimony flame retardant synergist or adjuvant.

For example, in one set of embodiments, the flame retardant polymer composition comprises a) one or more polymer resin as described above;

b) from about 1 to about 20%, about 2 to about 15%, about 3 to about 12%, by weight of halogenated aryl ether oligomers of formula I c) from about 1 to about 25%, about 2 to about 20%, about 5 to about 20%, by weight of a phenoxy material comprising monomers units of formula II, e.g., an ether comprising monomers units of formula III, e.g., an ether comprising monomers units of formula IIIa; or a carbonate comprising monomers units of formula IV, and d) from 0 to about 10%, 0 to about 5%, about 0 to about 3%, by weight of a non-antimony flame retardant synergist or adjuvant.

In another set of embodiments, the flame retardant polymer composition comprises a) one or more polymer resin as described above;

b) from about 1 to about 30%, e.g., 3 to about 25% by weight of halogenated aryl ether oligomers of formula I c) from about 20 to about 85%, e.g., about 30 to about 80% by weight of a phenoxy material comprising monomers units of formula II, and d) from 0 to about 10% by weight of a non-antimony flame retardant synergist or adjuvant.

In certain embodiments, a) is a polyolefin or a polystyrene, e.g., HIPS; b) is present in an amount of from 1 to 10 wt %, and c) is an ether present in an amount of from 30 to 60 wt %; or a) is a polyolefin or a polystyrene, e.g., HIPS; b) is present in an amount of from 7 to 15 wt %, and c) is an ether present in an amount of from 10 to 25 wt %.

In certain other embodiments, a) is a co polymer or blend comprising a polyolefin, a polystyrene, or a rubber, and e.g., ABS; b) is present in an amount of from about 5 to about 25 wt %, and c) is an aryl carbonate present in an amount of from 20 to 85 wt %; or a) is a co polymer or blend comprising a polyolefin, a polystyrene, or a rubber, and e.g., ABS, b) is present in an amount of from about 5 to about 20 wt %, and c) is an aryl carbonate present in an amount of from 50 to 80 wt %; or a) is a co polymer or blend comprising a polyolefin, a polystyrene, or a rubber, and e.g., ABS, b) is present in an amount of from about 12 to about 25 wt %, and c) is an aryl carbonate present in an amount of from 20 to 50 wt %.

The flame retardant composition may contain other flame retardants such as other halogenated organic flame retardants and phosphorus based flame retardants such as phosphine oxides and phosphorus acid salts, e.g., phosphonate, phosphinate or phosphate salts.

The invention eliminates the presence of antimony synergists and allows one to significantly reduce or eliminate the presence of many other metal based synergists. Known metal based synergist include, for example, metal oxides, hydroxides, sulphates, sulphites, sulphides, carbonates, carbides, nitrates, nitrites, nitrides, borates, silicates and phosphates. In one embodiment, the flame retardant composition is also free of iron oxide and organo iron compounds, in another embodiment the composition is free of all iron compounds, and in particular embodiments the composition is free of all metal based synergists.

However, in many embodiments flame retardant synergists which do not contain antimony or iron are present, especially as many compounds known to have activity as flame retardant synergists are also used for other purposes, for example, silica, titanium oxide and the like. In the present invention, these optional synergists are typically present at about 10% by weight of the composition or less.

Typically the optional non-antimony flame retardant synergist or adjuvant d) is selected from organic synergists such as melamine, melamine salts and silicones, and inorganic synergists such as boric acid, phosphoric acid, stannic acid, molybdic acid, tungstic acid, and the like;

salts of such acids including barium metaborate, calcium orthoborate, calcium metaborate, calcium pyroborate, trimagnesium tetraborate, manganese orthoborate, manganese tetraborate, nickel diborate, copper metaborate, zinc borate, zinc metaborate, zinc tetraborate, cadmium metaborate, cadmium tetraborate, sodium stannate and potassium stannate, magnesium stannate, cobalt stannate, zinc stannate, zinc molybdate, zinc tungstate and the like;

metal oxides such as silica, boehmite, aluminum oxide, iron oxide, titanium oxide, manganese oxide, magnesium oxide, zirconium oxide, zinc oxide, molybdenum oxide, cobalt oxide, bismuth oxide, chromium oxide, tin oxide, antimony oxide, nickel oxide, copper oxide, vanadium oxide, tungsten oxide and the like;

metal hydroxides such as aluminum hydroxide, magnesium hydroxide, tin hydroxide and zirconium hydroxide and the like;

magnesium silicates and aluminum silicates, including clays etc; zinc carbonate, magnesium carbonate, calcium carbonate, barium carbonate, zinc sulfide, titanium nitride, sodium sulfate and the like.

For example, when a metal compound is present as the optional flame retardant synergist, it is often an oxide, hydroxide or salt of zinc, magnesium, aluminum, tin, titanium or calcium.

The flame retardant combination b) and c) of the present invention is effective with many polymers and polymer blends. Polymer blends which incorporate polyphenylene ether resins are known and represent a particular embodiment of the invention. For example, addition of the halogenated aryl ethers to either a poly(2,6-dimethyl phenylene ether)/high impact polystyrene (PPE/HIPS) or a PC/ABS blend supplies all the necessary components of the present method, provided that there are no antimony or iron compounds present in the final composition. Of course, optional flame retardant synergists and other standard polymer additives may also be added, but as shown in the Examples, additional synergists are not needed for excellent flame retardance, when the halogenated aryl ethers of the invention are selected over other halogenated flame retardants.

For example, compositions comprising a PPE/HIPS polymer blend containing 20% poly(2,6-dimethyl phenylene ether) and brominated aryl ethers of the invention were prepared and compared to similar compositions containing other commercial, brominated flame retardants according to the UL-94 vertical burn test protocol. In the experiment, $\frac{1}{16}$" test bars were prepared from a composition comprising 12 wt % of a mixture of brominated aryl ethers with a bromine content between 60 and 83% as flame retardant, a similar composition comprising 12 wt % of decabromodiphenyl ethane as flame retardant, and a similar composition comprising 15 wt % of tris(tribromophenyl)cyanurate as flame retardant. No antimony compounds or other metal based synergists were added.

The composition of the present invention achieved the highest rating, UL-94 V-O, while the other compositions completely failed the test.

Similarly, excellent results are shown in the following examples for PC-ABS blends comprising 30 to 80% PC and from 22 to 8 wt % of the brominated aryl ethers.

Other blends with polyphenylene ethers and aryl carbonates are also expected to benefit from the present discovery and methods resulting in flame retardant and antimony free polymer compositions.

EXAMPLES

In preparing samples for the following experiments, all materials including resins, flame retardants and processing additives were first uniformly blended and then fed into the hopper of a twin screw extruder (W/P L/d=36) for compounding using a strand die and pelletized for injection molding on a Van Dorn 35 MT machine. Test bars were conditioned at 50% RH/23° C. and tested for mechanical/thermal properties and flammability as per ASTM/UL methods.

The brominated polyaryl ether flame retardant of the invention used in the examples is a mixture of brominated phenolic ether oligomers according to formula I comprising, as determined by gc analysis:

from about 35 to about 45% of 3-ring oligomers,
from about 35 to about 55% of 4-ring oligomers,
from about 3 to about 10% of 5-ring oligomers,
from about 3 to about 10% of 6-ring oligomers,
from about 0.1 to about 3% of 7-ring oligomers, and
from about 0 to about 2.5% of 8-ring oligomers;

and containing from about 70 to about 80 wt % bromine

The criteria for each flammability classification according to UL-94, Vertical Burn Test are as follows:

V-0: In a sample placed so that its long axis is parallel to the flame, the average period of flaming and/or smoldering after removing the igniting flame should not exceed ten seconds and none of the vertically placed samples should produce drips of burning particles which ignite absorbent cotton.

V-1: In a sample placed so that its long axis is parallel to the flame, the average period of flaming and/or smoldering after removing the igniting flame should not exceed thirty seconds and none of the vertically placed samples should produce drips of burning particles which ignite absorbent cotton.

V-2: In a sample placed so that its long axis is parallel to the flame, the average period of flaming and/or smoldering after removing the igniting flame should not exceed thirty seconds and the vertically placed samples produce drips of burning particles which ignite cotton.

Example 1

A series of 20% poly(2,6-dimethyl phenylene ether)/HIPS formulations containing different brominated flame retardants, as detailed in Table 1, were prepared by compounding in a twin screw extruder at 235° C. and 250 RPM to obtain pellets which were injection molded at 450° F., 200 RPM, injection pressure of 700 psi and hold pressure of 600 psi.

Test bars were screened using the UL-94 vertical burn test protocol, (ASTM D 3801, IEC 707, or ISO 1210). In this protocol, the molded test bar is subjected to two 10 second flame applications, 5 test bars for each formulation are tested. The time for the bar to extinguish after each flame application is noted and reported as Time 1 (T1) and Time 2 (T2) for the bar. The UL-94 Vertical Burn Test protocol classifies materials into four categories from Fail to UL-94 V-0. For screening purposes, the average burn time for T1 and T2 for all five molded test bars and the corresponding ratings are listed in Table 1.

TABLE 1

ATO Free HIPS Formulation/UL 94 Results

| | Brominated polyaryl ether (invention) | Decabromo diphenyl ether | Decabromo diphenyl ethane | Tris (tribromo-phenyl) cyanurate |
|---|---|---|---|---|
| FR, % | 12.0 | 12.0 | 12.0 | 15.0 |
| PPE, % | 20.0 | 20.0 | 20.0 | 20.0 |
| HIPS, % | 62.7 | 62.7 | 62.7 | 59.7 |
| KRATON D1101, % | 5.0 | 5.0 | 5.0 | 5.0 |
| ALKANOX 240, % | 0.2 | 0.2 | 0.2 | 0.2 |
| PETS wax, % | 0.1 | 0.1 | 0.1 | 0.1 |
| UL-94 1/16" | V-0 | Fail | Fail | Fail |
| Average Burn time | 2.6 sec | >30 sec | >30 sec | >30 sec |

KRATON D1101 is a linear triblock copolymer based on styrene and butadiene
ALKANOX 240 is a phosphite antioxidant Mechanical property testing was carried out on the above ATO free HIPS formulation containing the brominated polyaryl ether of the invention and a typical commercial formulation containing decabromodiphenyl ethane and ATO. The results are shown in Table 2 indicating that properties including tensile, flexural, impact, heat distortion temperature (HDT) are all superior with the inventive formulation compared with the corresponding standard formulation.

TABLE 2

ATO free formulation vs. traditional HIPS formulation

| | Brominated polyaryl ether (invention) FR1 | Decabromo diphenyl ethane FR3 |
|---|---|---|
| FR % | 12.0 | 12.0 |
| PPE (IV 40), % | 20.0 | — |
| ATO, % | — | 4.0 |
| HIPS, % | 62.7 | 78.7 |
| KRATON D1101, % | 5.0 | 5.0 |
| ALKANOX 240, % | 0.2 | 0.2 |
| PETS Wax, % | 0.1 | 0.1 |
| UL-94 1/16" rating | V-0 | V-0 |
| Notched Izod Impact Strength, 1/8" J/m | 4.4 | 1.9 |
| Gardner Impact, J | 6.98 | 6.16 |
| HDT (° C.) @ 1.8 MPa | 89.5 | 70.1 |
| Vicat softening temperature, ° C. | 121.3 | 97.6 |
| Tensile Strength, MPa | 39.8 | 24.2 |
| Elongation at Yield, % | 2.43 | 1.49 |
| Elongation at Break, % | 27.8 | 36.0 |
| Flexural Strength, MPa | 69.5 | 37.5 |
| Flexural Modulus, MPa | 2310.3 | 2068.9 |
| Melt flow index, 200° C./5 kg; g/10 mins | 0.60 | 8.38 |

Example 2

Following the procedures of Example 1, a series of ATO-free, 33% PPE:HIPS formulations containing different amounts of the brominated polyaryl ether of the invention were prepared and tested for FR activity. Results of the load level study are summarized in Table 3. A UL-94 Rating (1/16") is obtained at a 10% loading of the flame retardant.

TABLE 3

Brominated polyaryl ether of the invention
(FR1) in ATO-Free 1:3 PPE:HIPS

| FR1, % | 11.00 | 10.00 | 9.00 | 8.00 |
|---|---|---|---|---|
| PPE (IV 40), % | 22.25 | 22.50 | 22.75 | 23.00 |
| HIPS, % | 66.75 | 67.50 | 68.25 | 69.00 |
| UL-94 Rating (1/16") | V-0 | V-0 | V-1 | V-1 |
| Average burn time, sec | 3.3 | 4.2 | 5.3 | 5.8 |

Example 3

Following the procedures of Example 1, a series of ATO-free, 50% PPE:HIPS formulations containing different amounts of the brominated polyaryl ether of the invention were prepared and tested for FR activity. Results of the load level study are summarized in Table 4. A UL-94 Rating (1/16") is obtained at a 5% loading of the flame retardant.

TABLE 4

Brominated polyaryl ether of the invention
(FR1) in ATO-Free 1:1 PPE:HIPS

| FR1, % | 6.0 | 5.0 | 4.0 | 3.0 |
|---|---|---|---|---|
| UL-94 Rating (1/16") | V-0 | V-0 | V-1 | V-2 |
| Average burn time, sec | 3.3 | 4.2 | 5.3 | 5.8 |

Mechanical property testing was carried out on the above ATO free HIPS formulation containing 5 wt % of the brominated polyaryl ether of the invention (FR1) and a nearly identical formulation without the flame retardant. The physical properties are similar for each formulation, but the material without FR1 of course fails the flame retardance test. The results are shown in Table 5.

TABLE 5

Physical properties with and without FR1.

|  | w/o FR1 | 5% FR1 |
|---|---|---|
| FR 1, % | — | 5.0 |
| PPE (IV 40), % | 49.75 | 47.25 |
| HIPS, % | 49.75 | 47.25 |
| ALKANOX 240, % | 0.5 | 0.5 |
| UL-94 1/16"rating | fail | V-0 |
| Notched Izod Impact Strength, 1/8" J/m | 141.0 | 118.0 |
| Reverse Notched Izod Impact Strength, 1/8" J/m | 710.8 | 885.4 |
| HDT (° C.) @ 1.8 MPa | 114.1 | 115.0 |
| Tensile Strength, MPa | 58.2 | 57.1 |
| Elongation at Yield, % | 9.0 | 8.8 |
| Elongation at Break, % | 18.7 | 21.9 |
| Flexural Strength, MPa | 100.1 | 100.5 |
| Flexural Modulus, MPa | 2571 | 2569 |
| Melt flow index, 200° C./5 kg; g/10 mins | 16.2 | 20.0 |

PC/ABS Blends

Similarly in blends such as PC/ABS systems, FR1 (as described above) was found to be effective without the need for a metal synergist, i.e. ATO. Often commercial PC/ABS blends are used in a 80/20 or 85/15 ratio of PC/ABS. A load level study demonstrates the efficacy of the flame retardant in a V-0 PC/ABS (80/20) formulation shown below in Table 6.

TABLE 6

FR1 performance in ATO-free PC/ABS (80/20)

| FR1, % | 14.0 | 12.0 | 10.0 | 9.0 | 8.0 | 7.0 |
|---|---|---|---|---|---|---|
| UL-94 Rating (1/16") | V-0 | V-0 | V-0 | V-0 | V-0 | V-0 |
| Average burn time | 0.6 | 1.1 | 1.7 | 0.9 | 2.1 | 3.3 |

Table 7 compares the flame retardancy and physical properties of ATO-free PC/ABS (80/20) formulations comprising FR1 of the invention to other traditional flame retardants. Only the formulations with FR1 provide adequate flame retardancy with the added advantage of superior physical properties.

TABLE VII

Flame retardant ATO-free PC/ABS(80/20) formulations

| PC/ABS | FR1 | FR5 | FR6 | FR7 |
|---|---|---|---|---|
| FR % | 8.0 | 10.5 | 8.6 | 13.0 |
| UL-94 1/16" | V-0 | V-2 | V-2 | V-0 |
| Average burn time, sec | 1.7 | 1.6 | 2.6 | 0.6 |
| Melt flow index, 260 C./2.16 kg, g/10 mn | 9.4 | 8.6 | 9.7 | 33.9 |
| HDT @ 1.8 MPa, C. | 111.8 | 115.2 | 112.5 | 81.7 |
| Notched Izod impact strength, 1/8" J/m | 656.3 | 208.3 | 592.7 | 52.3 |
| Tensile strength, MPa | 64.6 | 67.4 | 64.7 | 69.8 |
| Elongation at yield, % | 5.3 | 5.6 | 5.5 | 4.4 |
| Elongation at break, % | 40.3 | 31.7 | 38.0 | 23.1 |
| Flexural strength, MPa | 104.7 | 108.7 | 106.6 | 113.0 |
| Flexural modulus, MPa | 2675.9 | 2692.4 | 2691.0 | 3003.4 |

FR1 = Brominated polyaryl ether of the invention
FR5 = Brominated phenoxy terminated carbonate oligomer
FR6 = poly (pentabromobenzyl acrylate)
FR7 = bisphenol-A bis-(diphenyl phosphate)

Table 8 shows the amount of FR1 (as described above) used to obtain a UL-94 Rating (1/16") of V-0 in PC/ABS containing the listed amount of PC, e.g., 30% PC is a 30/70 ration of PC to ABS.

TABLE 8

ATO-free, UL-94 V-0 PC/ABS/FR1 Formulations

| % PC | % FR1 |
|---|---|
| 80 | 8 |
| 70 | 10 |
| 60 | 12 |
| 50 | 14 |
| 45 | 16 |
| 40 | 18 |
| 30 | 22 |

The invention claimed is:

1. An antimony free flame retardant polymer composition comprising
   a) a polymer resin, selected from a polyolefin; a polycarbonate, a rubber modified polystyrene, a polyamide, a polyurethane, polyacetal, epoxy resin, a natural rubber, a synthetic rubber and blends and copolymers thereof;
   b) from about 1 to about 35% by weight based the weight of the antimony free flame retardant polymer composition of a mixture of brominated phenolic ether oligomers of formula I

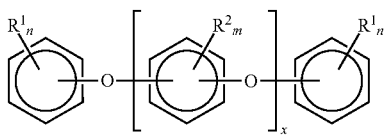

wherein $R^1$ and $R^2$ are bromine, n is 3, 4 or 5, m is 3 or 4, and x is from 1 to 10, having a halogen content of from about 65 to about 83 wt %, and which mixture comprises about 30 to about 50% 3-ring oligomers, 30 to 60% 4-ring oligomers, 1 to 15% 5-ring oligomers, less than 15% total of oligomers containing 6 or more phenyl rings and about 0 to about 2% 2-ring oligomers;

c) from 5 to about 85% by weight based on the weight of the antimony free flame retardant polymer composition of a polyphenylene ether of formula IIIa

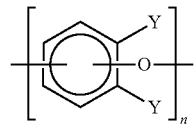

wherein Y is a $C_{1-4}$ alkyl group and n is from about 12 to about 500; and d) from 0 to about 10% by weight of a non-antimony flame retardant synergist or adjuvant, which flame retardant polymer composition is free of antimony compounds and iron compounds, and wherein polymer resin a) is not the same as the oligomer or polymer of c).

2. The composition according to claim 1 wherein a) comprises a polystyrene resin, b) is present in an amount of from 1 to 10 wt %, and c) is an ether of formula Ill present in an amount of from 30 to 60 wt %.

3. The composition according to claim 1 wherein a) comprises a polystyrene resin, b) is present in an amount of from 7 to 15 wt %, and c) is an ether of formula III present in an amount of from 10 to 25 wt %.

4. The composition according to claim 2 wherein a) comprises a high impact rubber modified polystyrene.

5. The composition according to claim 3 wherein a) comprises a high impact rubber modified polystyrene.

6. The composition according to claim 1 wherein the non-antimony flame retardant synergist or adjuvant is a melamine, melamine salt, a silicone, or a metal based synergist selected from metal oxides, hydroxides, sulphates, sulphites, sulphides, carbonates, carbides, nitrates, nitrites, nitrides, borates, silicates and phosphates of zinc, magnesium, aluminum, tin, titanium or calcium.

7. The composition according to claim 6 wherein the non-antimony flame retardant synergist or adjuvant is a melamine, melamine salt or a silicone and the polymer composition is free of the metal based synergists.

8. The composition according to claim 1 wherein the mixture of brominated phenolic ether oligomers b) comprises
from about 30 to about 45% of 3-ring oligomers,
from about 35 to about 60% of 4-ring oligomers,
from about 1 to about 10% of 5-ring oligomers,
from about 1 to about 10% of 6-ring oligomers,
from about 0.1 to about 4% of 7-ring oligomers, and
from about 0 to about 2.5% of 8-ring oligomers.

* * * * *